(12) United States Patent  (10) Patent No.: US 8,751,477 B2
Bryant  (45) Date of Patent: Jun. 10, 2014

(54) QUALITY CONTROL SYSTEM FOR PROVIDING RESULTS IN RESPONSE TO QUERIES

(71) Applicant: John E. Bryant, Berkeley, CA (US)

(72) Inventor: John E. Bryant, Berkeley, CA (US)

(73) Assignee: IAC Search & Media, Inc., Oakland, CA (US)

( * ) Notice: Subject to any disclaimer, the term of this patent is extended or adjusted under 35 U.S.C. 154(b) by 57 days.

(21) Appl. No.: 13/645,809

(22) Filed: Oct. 5, 2012

(65) Prior Publication Data

US 2014/0101120 A1    Apr. 10, 2014

(51) Int. Cl.
*G06F 17/30* (2006.01)

(52) U.S. Cl.
USPC .......................................... 707/707; 707/748

(58) Field of Classification Search
CPC ................... G06F 17/30864; G06F 17/30616; G06F 17/30929; G06F 17/30663; G06F 17/30424; G06F 17/3064; G06F 17/30696
USPC .................. 707/707, 708, 748–750
See application file for complete search history.

(56) References Cited

U.S. PATENT DOCUMENTS

| | | | | |
|---|---|---|---|---|
| 7,444,327 B2 * | 10/2008 | Watson et al. | ......................... | 1/1 |
| 7,505,961 B2 * | 3/2009 | Finger, II | ............................. | 1/1 |
| 7,836,060 B1 * | 11/2010 | Rennison | ...................... | 707/749 |
| 8,126,898 B2 * | 2/2012 | Constantinides | ............. | 707/748 |
| 2006/0149723 A1 * | 7/2006 | Finger, II | ........................... | 707/3 |
| 2008/0109426 A1 * | 5/2008 | Constantinides | ................. | 707/5 |
| 2008/0147646 A1 * | 6/2008 | Jaschek et al. | .................... | 707/5 |
| 2011/0131205 A1 * | 6/2011 | Iyer et al. | ...................... | 707/728 |
| 2013/0212092 A1 * | 8/2013 | Dean et al. | ..................... | 707/729 |

* cited by examiner

*Primary Examiner* — Debbie Le
(74) *Attorney, Agent, or Firm* — Stephen M. De Klerk (57) ABSTRACT

The invention further provides a method and system for providing results in response to queries. A challenge keyword is transmitted to a remote search engine computer system and a reference result is received from the search engine computer system. A reference score is calculated based on the reference search result. The challenge keyword in entered into at least a first engine and a challenge result is received from the first engine. A challenge answer score is calculated based on the challenge result. A challenge reference score for the first engine based on a comparison of the challenge answer score for the first engine with the reference score, and published for further analysis.

22 Claims, 5 Drawing Sheets

QUALITY CONTROL SYSTEM FOR PROVIDING RESULTS IN RESPONSE TO QUERIES

BACKGROUND OF THE INVENTION

1). Field of the Invention

This invention relates generally to a host computer system and a method for providing results in response to queries, and more specifically to controlling quality of results provided by one or more engines of such a system.

2). Discussion of Related Art

The Internet is often used for obtaining information from search engines and other host computer systems. A user at a live remote computer system enters a live query and transmits the live query over the Internet to such a host (live) computer system. One or more keywords are then extracted from the live query by the host system and entered by the host system into one or more engines. Each engine is optimized to provide a different kind of information such as answering questions, suggesting products to buy, suggesting related web docs, or additional search terms to try (related search). The engines return live results to the host system, and the host system decides how to combine the engine's results into an HTML response page which is transmitted back over the Internet to the live remote computer system for viewing within a browser of the live remote computer system.

The engines are often operated by different teams within an organization and these teams are potentially optimizing for different performance metrics. There is typically no specific common relevance for the functioning of an engine. An engine may for example provide irrelevant results, which may go undetected or unnoticed by a team operating the engine. There is usually also no uniformity in quality control from one engine to the next as different teams may have different standards that do not necessarily correlate with one another and do not provide for the ability to judge the relevance of the page as a whole. System operators may wish to determine the relevance of individual engine results or may wish to evaluate the relevance of the page as a whole and how the results from the various engines are displayed in relation to one another.

SUMMARY OF THE INVENTION

The invention provides a host computer system for providing results in response to queries, including at least a first engine, a quality control system and a live system. The quality control system includes a reference score calculation module calculating a reference score, a challenge keyword submission module entering a challenge keyword into at least a first engine, a challenge result receiving module receiving at least one challenge result from the first engine in response to the challenge keyword, a challenge answer score calculation module calculating a challenge answer score based on the challenge result, a challenge answer-to-reference score calculation module calculating a challenge reference score for the first engine based on a comparison of the challenge answer score for the first engine with the reference score and an engine relevance score publishing module publishing an engine relevance score based on the challenge reference score for the first engine. The live system includes a live query receiving module receiving a live query having a user keyword over a network from at least one live remote computer system, a user keyword submission module entering the user keyword into the first engine, a live result receiving module receiving at least one live result from the first engine based on the user keyword and a live result transmission module transmitting the live result from the first engine over the network to the at least one live remote computer system.

The invention further provides a computer-based method of providing results in response to queries, including calculating a reference score, entering a challenge keyword into at least a first engine, receiving at least one challenge result from the first engine in response to the challenge keyword, calculating a challenge answer score based on the challenge result, calculating a challenge reference score for the first engine based on a comparison of the challenge answer score for the first engine with the reference score; publishing the challenge reference score for the first engine, receiving a live query having a user keyword over a network from at least one live remote computer system, entering the user keyword into the first engine, receiving at least one live result from the first engine based on the user keyword and transmitting the live result from the first engine over the network to the at least one live remote computer system.

BRIEF DESCRIPTION OF THE DRAWINGS

The invention is further described by way of example with reference to the accompanying drawings, wherein.

DETAILED DESCRIPTION OF THE INVENTION

Figures 1, 2:
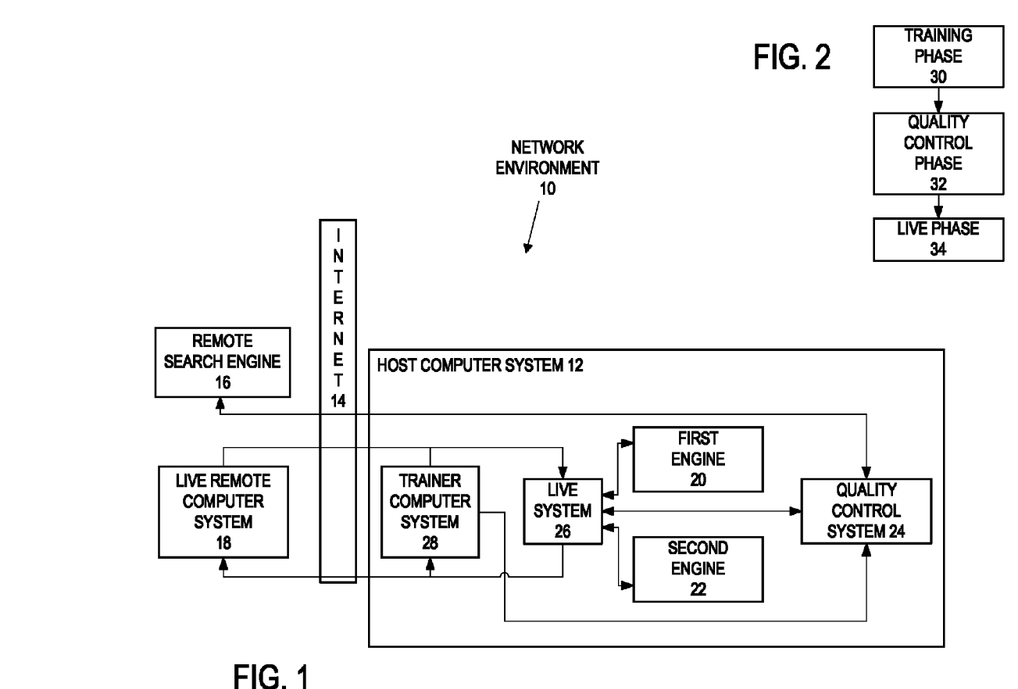
FIG. 1 is a block diagram of a network environment within which aspects of the invention reside.
FIG. 2 is flow chart illustrating three phases of operating the network environment.

FIG. 1 of the accompanying drawing illustrates a network environment 10, including a host computer system 12, a network in the form of the Internet 14, a remote search engine 16 connected to the host computer system 12 over the Internet 14, and a live remote computer system 18 connected over the Internet 14 to the host computer system 12. The host computer system 12 includes a first engine 20, a second engine 22, a quality control system 24, a live system 26 and a trainer computer system 28.

FIG. 2 illustrates three different phases according to which the network environment 10 of FIG. 1 is operated. During a training phase 30, the trainer computer system 28 is used to retrieve training results via the live system 26 from the first and second engines 20 and 22 and an operator of the trainer computer system 28 then enters engine-level and page-level parameters into the quality control system 24. During a quality control phase 32, the quality control system 24 challenges the remote search engine 16 for purposes of calculating a reference score. The quality control system 24 also challenges the live system 26 and thereby indirectly challenges the first and second engines 20 and 22 to determine how well the first and second engines 20 and 22 perform against the remote search engine 16. During a live phase 34, a user at the live remote computer system 18 interacts with the live system 26 to retrieve results from the first and second engines 20 and 22.

Figure 3:
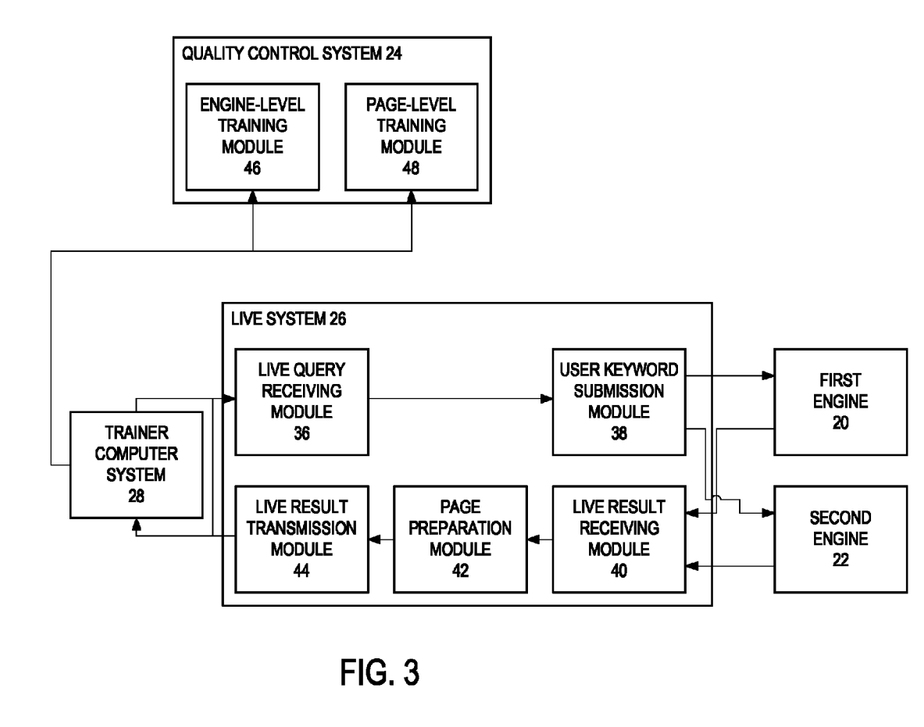
FIG. 3 is a block diagram of the components of the network environment that are used in a training phase thereof.

FIG. 3 illustrates the training phase 30 in more detail. The live system 26 includes a live query receiving module 36, a user keyword submission module 38, a live result receiving module 40, a page preparation module 42, and a live result transmission module 44.

A trainer at the trainer computer system 28 downloads a search interface from the live system 26 and enters a live query into the interface. The trainer then uses the trainer computer system 28 to transmit the training query to the live system 26. The live query receiving module 36 is connected to the trainer computer system 28 to receive the training query. The user keyword submission module 38 is connected to the live query receiving module 36. The user keyword submission module 38 extracts a training keyword from the training query and enters the training keyword into the first and second engines 20 and 22.

The first and second engines 20 and 22 then extract training results based on the training keyword and return the training results to the live system 26. The live result receiving module 40 receives a training result from the first engine 20 and a training result from the second engine 22. The page preparation module 42 is connected to the live result receiving module 40. The page preparation module 42 combines the training results received by the live result receiving module 40 from the first and second engines 20 and 22 on one page. The live result transmission module 44 is connected to the page preparation module 42. The live result transmission module 44 receives the page from the page preparation module 42 and transmits the page to the trainer computer system 28. The page includes results from the engines 20 and 22 in relative order and in a way that's consistent with what a user would see if they transmitted the training query.

The quality control system 24 contains an engine-level training module 46 and a page-level training module 48. The trainer computer system 28 enters the training keyword and the training results page into the engine-level training module 46 and the page-level training module 48. The trainer at the trainer computer system 28 also makes a human determination as to the relevance of the training result received from the first engine 20 and enters a training relevance score for the first engine 20 into the engine-level training module 46. The trainer makes a similar determination as to the relevance of the training result received from the second engine 22 and enters a training relevance score for the second engine 22 into the engine-level training module 46. The trainer further makes a determination as to the relevance of the page as a whole and enters a training relevance score for the page into the page-level training module 48. The training data for the page as whole is based on the trainer's determination of the placement and relative order of the results of the respective engines 20 and 22.

The trainer then enters a new keyword into the trainer computer system 28 and repeats the process hereinbefore described. Over time, the engine-level training module 46 and page-level training module 48 develop a sufficient amount of data to determine a respective set of parameters. For example, the engine-level training module 46 develops an engine-level parameter set based on the training keywords, training results pages and training relevance scores. The page-level training module 48 determines a page-level parameter set based on the training keywords, training results pages and training relevance scores. These parameters roughly reflect human relevance determination as perceived by a trainer at the trainer computer system 28.

Figure 4:
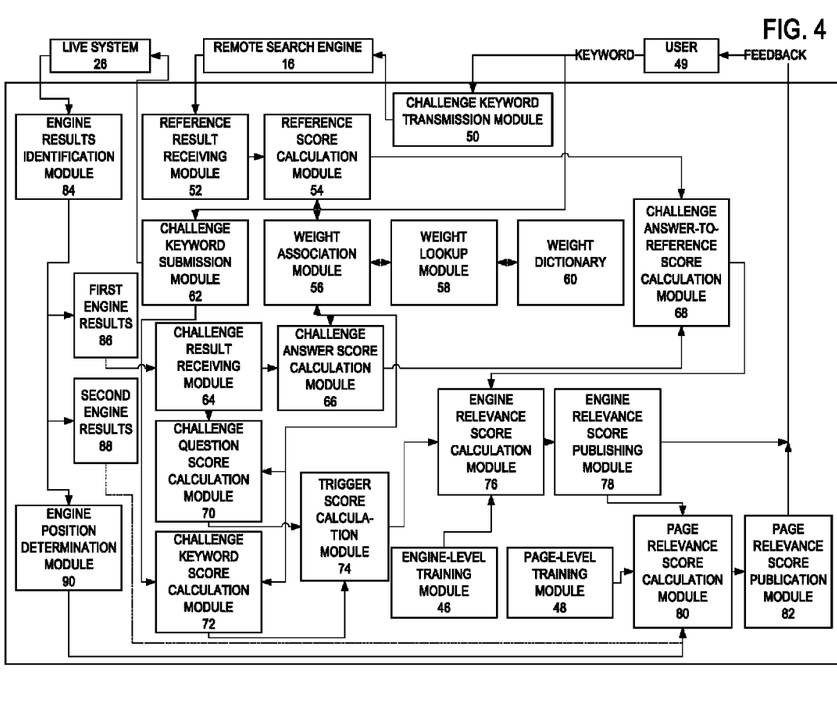
FIG. 4 is a block diagram of the network environment of components that are used in a quality control phase.

FIG. 4 illustrates the quality control phase 32 in more detail. The quality control system 24 further includes a challenge keyword transmission module 50. A user 49 enters a challenge keyword into the challenge keyword transmission module 50. The challenge keyword transmission module 50 then transmits a challenge keyword over the Internet 14 to the remote search engine 16. The challenge keyword may for example be "Barack Obama," hereinafter "BO." The remote search engine 16 then returns reference (search) results where each search result is a title and abstract, to the quality control system 24. The quality control system 24 includes a reference result receiving module 52 for receiving the reference result page. The reference result page may for example be in the following form:

$$\begin{bmatrix} 1. & BO\ HD \\ & \text{Answer} \\ 2. & BO\ \text{Wiki} \\ & \text{Answer} \\ 10. & BO\ \text{Facebook} \\ & \text{Answer} \end{bmatrix} \quad [1]$$

The quality control system 24 includes a reference score calculation module 54 connected to the reference result receiving module 52. The reference score calculation module 54 utilizes the reference result page to determine a vector such as the following:

$$\begin{bmatrix} \text{Barack:} & W_1.freq_1 \\ \text{Obama:} & W_2.freq_2 \\ \text{White:} & W_3.freq_3 \\ \text{House:} & W_4.freq_4 \\ \text{President:} & W_p.freq_p \\ \text{Facebook:} & W_i.freq_i \end{bmatrix} \quad [2]$$

, wherein "W" is weight and "freq" is frequency. The frequency is determined by the number of times that particular terms appear in the challenge result page. The quality control system 24 further includes a weight association module 56, a weight lookup module 58 and a weight dictionary 60. The weight dictionary 60 includes a large number of terms with respective weights associated therewith. Each weight is predetermined in a separate process wherein a weight of a term is increased with decreased frequency. For example, in a corpus of documents the word "the" will appear a large number of times and will then be assigned a low weight score. A word such as "president" will appear relatively infrequently in the corpus of documents and will then be assigned a relatively high weight score. The reference score calculation module 54 requests an association of a weight from the weight association module 56 for each one of the terms in the vector. The weight association module 56 invokes the weight lookup module 58 to determine a weight of each one of the terms in the vector in the weight dictionary 60. The weight lookup module 58 then returns the weights of the respective terms to the weight association module 56. The weight association module 56 then adds the weights to the respective terms in the vector.

The quality control system 24 further includes a challenge keyword submission module 62 that receives the challenge keyword from the user 49 and submits the challenge keyword to the live system 26. As is the case for a live remote user, the live system returns an HTML response page. An engine results identification module 84 identifies the results of the first and second engines 20 and 22 (See FIG. 2) on the HTML response page, which are then extracted as first engine results 86 and second engine results 88 respectively. The quality control system 24 has a challenge result receiving module 64 that receives a challenge result in the manifestation of the first engine results 86. The first engine results 86 include a question (Q) and answer (A) pair, or a plurality of questions and answer pairs, assuming the engine 86 was a Q/A engine and not e.g. a shopping results engine. In this case the abstract of the result is what is treated as the "answer". The quality control system 24 further has a challenge answer score calculation module 66 that receives the challenge answer from the challenge result receiving module 64. The challenge answer score calculation module 66 calculates a challenge answer score that may take the following form:

$$V_A = \begin{bmatrix} \text{Barack} & W_1, & 1 \\ \text{Obama} & W_2, & 1 \\ \text{is} & W_{is}, & 1 \\ \text{the} & W_{the}, & 1 \\ \text{current} & W_c, & 1 \\ \text{president} & W_p, & 2 \end{bmatrix} \quad [3]$$

The challenge score calculation module 66 again invokes the weight association module 56 to determine a weight of each term in the answer and calculates the frequency of each term in the answer.

The reference score represented in equation [2] above and the challenge answer score represented in equation [3] above are then provided to a challenge answer-to-reference score calculation module 68 forming part of the quality control system 24. The challenge answer-to-reference score calculation module 68 then compares the challenge answer score with the reference score as part of a process to determine the relevance of the first engine 20. The answer score can thus be represented by the following:

$$AS=f(D,V_A) \quad [4]$$

where f is function computing similarity.

The quality control system 24 also includes a challenge question score calculation module 70 that receives the challenge question from the reference result receiving module 64. The challenge question score calculation module 70 then calculates a challenge question score based on the challenge question using the weight association module 56. The challenge question may for example be vectorized in the following manner:

$$V_Q = \begin{bmatrix} \text{Who} & W_k, & 1 \\ \text{is} & W_{is}, & 1 \\ \text{Barack} & W_1, & 1 \\ \text{Obama} & W_2, & 1 \end{bmatrix} \quad [5]$$

The quality control system 24 further has a challenge keyword score calculation module 72 that receives the challenge keyword from the challenge keyword submission module 62. The challenge keyword score calculation module 72 calculates a challenge keyword score based on the challenge keyword submitted by the challenge keyword submission module 62 to the first engine 20 using the weight association module 56. The challenge keyword may for example be vectorized in the following manner:

$$V_{BO} = \begin{bmatrix} \text{Barack} & W_1, & 1 \\ \text{Obama} & W_2, & 1 \end{bmatrix} \quad [6]$$

The quality control system 24 also includes a trigger score calculation module 74 that receives the challenge question score from the challenge question score calculation module 70 and the challenge keyword score from the challenge keyword score calculation module 72. The trigger score calculation module 74 then calculates a trigger score based on the combination of the challenge question score and the challenge keyword score. A low trigger score is an indication that the result was loosely triggered by the first engine 20, whereas a higher trigger score only indicates a high correlation between the challenge keyword and the returned keyword. The trigger score may be represented as follows:

$$TS=f(V_Q,V_{BO}) \quad [7]$$

The challenge answer-to-reference score calculation module 68 provides the challenge reference score to an engine relevance score calculation module 76 forming part of the quality control system 24. The trigger score calculation module 74 also provides the trigger score to the engine relevance score calculation module 76. The engine relevance score calculation module 76 then uses the combination of the answer score and the trigger score together with the parameter set calculated in the engine-level training module 46 to calculate an engine relevance score, which can be represented by the following formula:

$$E_1=f(TS,AS)$$

where 'f' is an automatically learned function based on the training data.

The quality control system 24 further includes an engine relevance score publishing module 78 that receives the engine relevance score from the engine relevance score calculation module 76. The engine relevance score publishing module 78 publishes the engine relevance score for retrieval by the user 49. The user 49 may for example be an interested party such as personnel operating the first engine 20. The personnel may then make modifications to the first engine 20 (See FIG. 2) to improve its score for a particular question and answer pair relating to a particular keyword.

The above process of providing a relevance score for the first engine results 86 by the engine relevance score calculation module 76 and then publishing the engine relevance score with the engine relevance score publishing module 78 is repeated simultaneously for the second engine results 88 and any other engines in the HTML response. The relevance scores of the first and second engine results 86 and 88 are then entered into a page relevance score calculation module 80 forming part of the quality control system 24. An engine position determination module 90 receives the page and the identification of the engine results from the engine results identification module 84. The engine position determination module 90 then determines the relative position of the results of the respective engines for purposes of inclusion in a vector that also includes the engine scores. The following vector illustrates the data that is received by the page relevance score calculation module 80:

(1, SA, score)
(2, NAF, score)
⋮
(10, Delta, score)
(RS, score)                                                        [9]

The particular engine 20 or 22 is indicated by the name of the engine (SA in position 1 in [9], NAF in position 2 in [9], Delta in position 10 in [9], etc.). In each case, the relevance score of the engine result (E from above) is also provided in the vector.

The page relevance score calculation module 80 then utilizes the vector in equation [9] together with the parameters set in the page-level training module 48 to calculate a page relevance score for a page based on a combination of the challenge relevance scores for the first and second engines 20 and 22 and any other engines and their relative positions. The page relevance score calculation module 80 may also utilize separate factors for ranking the engines based upon their location in the page. For example, a response at the top of the page could be more important than a result at the bottom. The quality control system 24 further includes a page relevance score publication module 82 that receives the page relevance score from the page relevance score calculation module 80. The page relevance score publication module 82 then publishes a page relevance score for retrieval by the user 49 for further analysis. For purposes of page level analysis, the user may be an interested personnel who would like to determine the relevance of a page as a whole.

Figure 5:
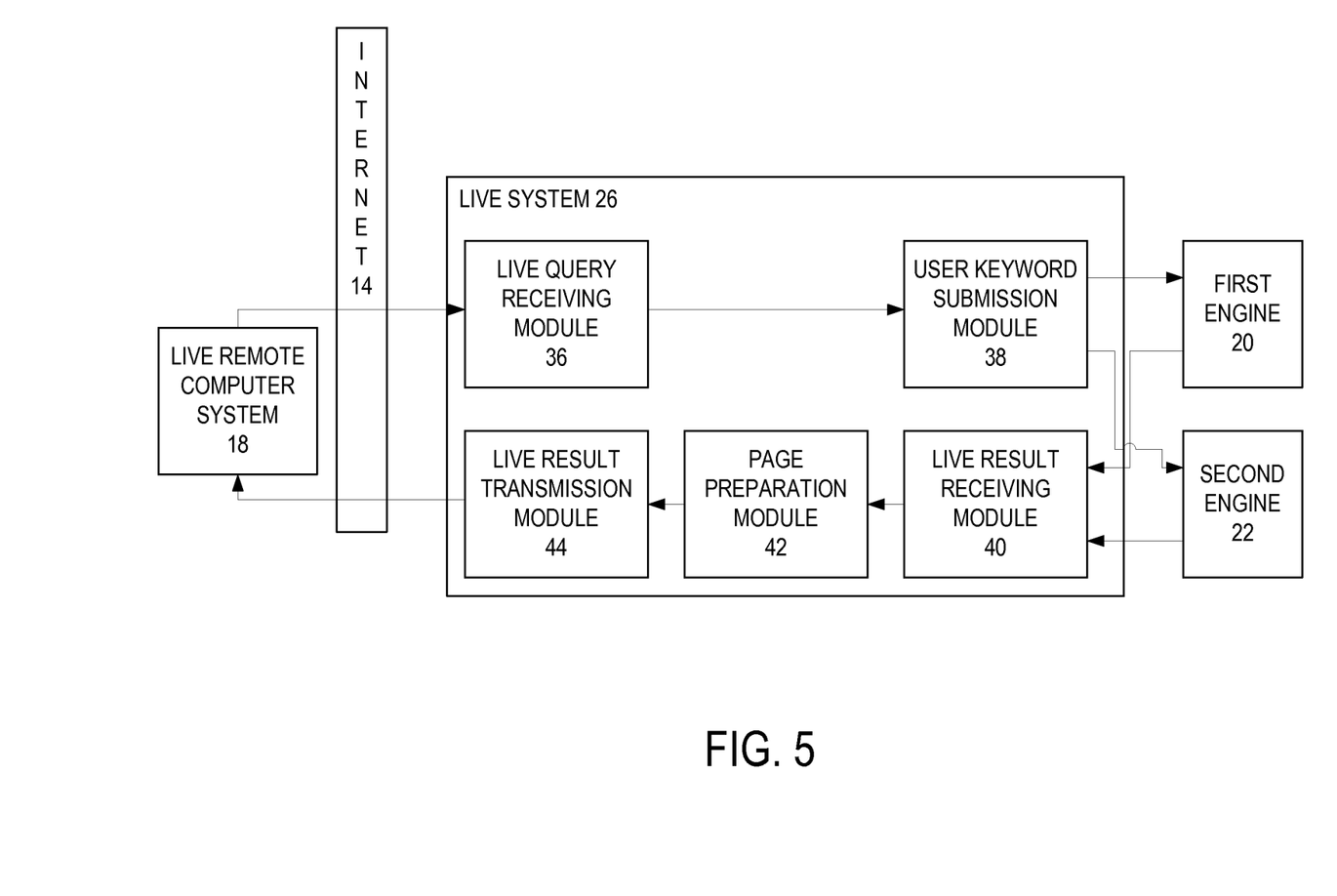
FIG. 5 is a block diagram of components of the network environment that are used in a live phase.

FIG. 5 illustrates the live phase 34 in FIG. 2 in more detail. A user at the live remote computer system 18 transmits a live query over the Internet 14, which is received by the live query receiving module 36. The user keyword submission module 38 extracts a user keyword from the live query and enters the user keyword into the first and second engines 20 and 22. The live result receiving module 40 receives live results from the first and second engines 20 and 22 and the live results are combined onto one page by the page preparation module 42. The live result transmission module 44 then transmits the page over the Internet 14 to the live remote computer system 18. The user at the live remote computer system 18 can then view the page prepared by the page preparation module 42. The page preparation module 42 typically prepares the page in HTML code and a browser on the live remote computer system 18 renders the HTML code into a viewable page.

Figure 6:
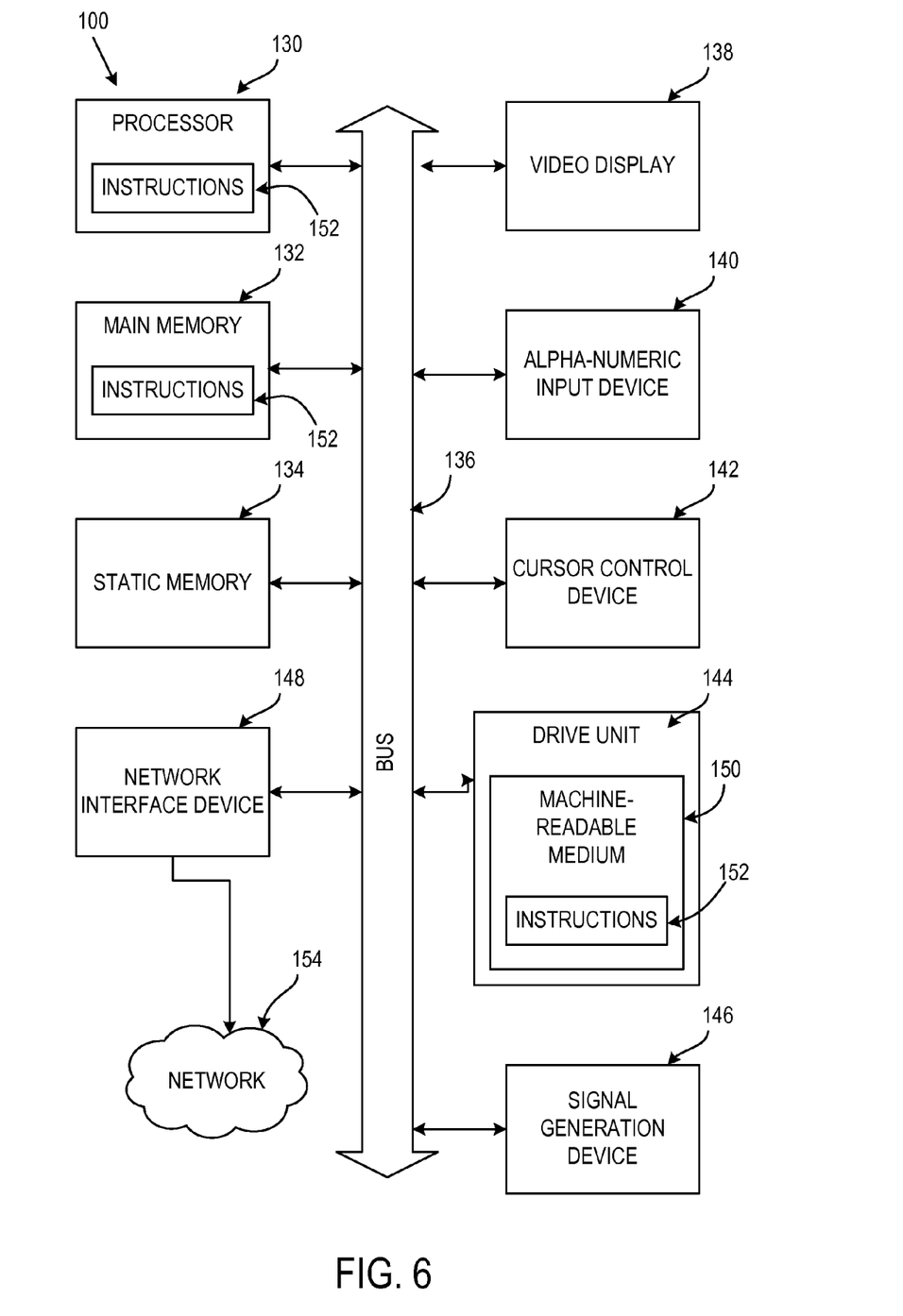
FIG. 6 is a block diagram of a machine in the form of a computer system that may form part of a computer system in the network environment.

FIG. 6 shows a diagrammatic representation of a machine in the exemplary form of a computer system 100 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 100 includes a processor 130 (e.g., a central processing unit (CPU), a graphics processing unit (GPU), or both), a main memory 132 (e.g., read-only memory (ROM), flash memory, dynamic random access memory (DRAM) such as synchronous DRAM (SDRAM) or Rambus DRAM (RDRAM), etc.), and a static memory 134 (e.g., flash memory, static random access memory (SRAM, etc.), which communicate with each other via a bus 136.

The computer system 100 may further include a video display 138 (e.g., a liquid crystal display (LCD) or a cathode ray tube (CRT)). The computer system 100 also includes an alpha-numeric input device 140 (e.g., a keyboard), a cursor control device 142 (e.g., a mouse), a disk drive unit 144, a signal generation device 146 (e.g., a speaker), and a network interface device 148.

The disk drive unit 144 includes a machine-readable medium 150 on which is stored one or more sets of instructions 152 (e.g., software) embodying any one or more of the methodologies or functions described herein. The software may also reside, completely or at least partially, within the main memory 132 and/or within the processor 130 during execution thereof by the computer system 100, the memory 132 and the processor 130 also constituting machine readable media. The software may further be transmitted or received over a network 154 via the network interface device 148.

While the instructions 152 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A host computer system for providing results in response to queries, comprising:
    at least a first engine;
    a quality control system, including:
        a challenge keyword transmission module transmitting the challenge keyword to a remote search engine computer system; and
        a reference result receiving module receiving at least one reference result from the search engine computer system in response to the transmission of the challenge keyword to the remote search engine computer system;
        a reference score calculation module calculating a reference score, wherein the reference score is calculated based on the reference search result;
        a challenge keyword submission module entering a challenge keyword into at least a first engine;

a challenge result receiving module receiving at least one challenge result from the first engine in response to the challenge keyword;

a challenge answer score calculation module calculating a challenge answer score based on the challenge result;

a challenge answer-to-reference score calculation module calculating a challenge reference score for the first engine based on a comparison of the challenge answer score for the first engine with the reference score; and an engine relevance score publishing module publishing an engine relevance score based on the challenge reference score for the first engine; and a live system including:
a live query receiving module receiving a live query having a user keyword over a network from at least one live remote computer system;

a user keyword submission module entering the user keyword into the first engine;

a live result receiving module receiving at least one live result from the first engine based on the user keyword; and a live result transmission module transmitting the live result from the first engine over the network to the at least one live remote computer system.

2. The host computer system of claim 1, wherein in the remote search engine computer system returns a reference results page and the calculation of the reference score includes calculating a reference vector that includes at least a frequency of terms in the reference results page.

3. The host computer system of claim 2, the quality control system further comprising:
a weight dictionary stored in a data store;
a weight lookup module looking up a weight for each term in the weight dictionary; and
a weight association module attaching the weight of each term in the reference vector.

4. The host computer system of claim 2, wherein the challenge result includes at least a challenge answer and the calculation of the challenge reference score includes calculating an answer vector that includes at least a frequency of terms in the challenge answer, wherein the answer vector is compared with the reference vector to calculate the reference score for the first engine.

5. The host computer system of claim 4, the quality control system further comprising:
a weight dictionary stored in a data store;
a weight lookup module looking up a weight for each term in the weight dictionary; and
a weight association module attaching the weight of each term in the answer vector.

6. The host computer system of claim 4, wherein the comparison of the answer vector with the reference vector results in an answer score and the challenge result includes a challenge question, the quality control system further comprising:
a challenge keyword score calculation module calculating a challenge keyword score based on the challenge keyword;
a challenge question score calculation module calculating a challenge question score based on the challenge question; and
a trigger score calculation module calculating a trigger score based on the comparison of the challenge keyword score with the challenge question score, the challenge answer-to-reference score calculation module calculating the challenge relevance score for the first engine based on the combination of the answer score and the trigger score.

7. The host computer system of claim 6, the quality control system further comprising:
an engine relevance score calculation module, wherein the challenge reference score for the first engine is calculated by the engine relevance score calculation module, the quality control system further comprising:
an engine-level training module training the engine relevance score calculation module by:
entering a plurality of training keywords into the first engine;
receiving a training result page for each training keyword, the training result page being entered into the engine relevance score calculation module in association with a respective training keyword; and
entering a training relevance score for each training results page into the engine relevance score, the training engine calculation module determining an engine-level parameter set based on the training keywords, training results pages and training relevance scores, the engine-level parameter set being used to calculate the challenge relevance score.

8. The host computer system of claim 1, wherein:
the challenge keyword submission module enters the challenge keyword into at least a second engine;
a challenge result receiving module receives at least one challenge result from the second engine in response to the challenge keyword;
the challenge answer score calculation module calculates a challenge answer score based on the challenge result received from the second engine;
calculating a challenge reference score for the second engine based on a comparison of the challenge answer score received from the second engine with the challenge reference score;
the challenge reference score publishing module publishes the challenge reference score for the second engine;
the user keyword submission module enters the user keyword into the second engine;
the live result receiving module receives at least on live result from the second engine based on the user keyword; and
the live result transmission module transmits the live result received from the second engine over the network to the at least one live remote computer system.

9. The host computer system of claim 8, the quality control system further comprising:
a page relevance score calculation module calculating a page relevance score for a page based on a combination of the challenge relevance scores for the first and second engines; and
a page relevance score publication module publishing the challenge reference score for the page; and the live system includes
a page preparation module combining the live results received from the first and second engines into one live results page that is transmitted to the live remote computer system.

10. The host computer system of claim 9, wherein the page relevance score is calculated based on a vector that includes a position of the challenge results received from the first and second engines.

11. The host computer system of claim 9, the quality control system further comprising:

a page-level training module training the page relevance score calculation module by:
entering a plurality of training keywords into the first and second engines;
receiving a training result page for each training keyword, the training result page being entered into the page relevance score calculation module in association with a respective training keyword; and
entering a training relevance score for each training results page into the page relevance score, the page relevance score calculation module determining a page-level parameter set based on the training keywords, training results pages and training relevance scores, the page-level parameter set being used to calculate the challenge relevance score.

12. A computer-based method of providing results in response to queries, comprising:
transmitting the challenge keyword to a remote search engine computer system;
receiving at least one reference result from the remote search engine computer system in response to the transmission of the challenge keyword to the remote search engine computer system;
calculating a reference score, wherein the reference score is calculated based on the reference search result;
entering a challenge keyword into at least a first engine;
receiving at least one challenge result from the first engine in response to the challenge keyword;
calculating a challenge answer score based on the challenge result;
calculating a challenge reference score for the first engine based on a comparison of the challenge answer score for the first engine with the reference score;
publishing the challenge reference score for the first engine;
receiving a live query having a user keyword over a network from at least one live remote computer system;
entering the user keyword into the first engine;
receiving at least one live result from the first engine based on the user keyword; and
transmitting the live result from the first engine over the network to the at least one live remote computer system.

13. The method of claim 12, wherein in the remote search engine computer system returns a reference results page and the calculation of the reference score includes calculating a reference vector that includes at least a frequency of terms in the reference results page.

14. The method of claim 13, further comprising:
storing a weight dictionary in a data store;
looking up a weight for each term in the weight dictionary; and
attaching the weight of each term in the reference vector.

15. The method of claim 13, wherein the challenge result includes at least a challenge answer and the calculation of the challenge reference score includes calculating an answer vector that includes at least a frequency of terms in the challenge answer, wherein the answer vector is compared with the reference vector to calculate the reference score for the first engine.

16. The method of claim 15, further comprising:
storing a weight dictionary in the data store;
looking up a weight for each term in the weight dictionary; and
attaching the weight of each term in the answer vector.

17. The method of claim 15, wherein the comparison of the answer vector with the reference vector results in an answer score and the challenge result includes a challenge question, further comprising:
calculating a challenge keyword score based on the challenge keyword;
calculating a challenge question score based on the challenge question;
calculating a trigger score based on the comparison of the challenge keyword score with the challenge question score; and
calculating the challenge relevance score for the first engine based on the combination of the answer score and the trigger score.

18. The method of claim 17, wherein in the challenge reference score for the first engine is calculated by an engine relevance score calculation module, further comprising:
training the engine relevance score calculation module by:
entering a plurality of training keywords into the first engine;
receiving a training result page for each training keyword, the training result page being entered into the engine relevance score calculation module in association with a respective training keyword; and
entering a training relevance score for each training results page into the engine relevance score, the training engine calculation module determining an engine-level parameter set based on the training keywords, training results pages and training relevance scores, the engine-level parameter set being used to calculate the challenge relevance score.

19. The method of claim 12, further comprising:
entering the challenge keyword into at least a second engine;
receiving at least one challenge result from the second engine in response to the challenge keyword;
calculating a challenge answer score based on the challenge result received from the second engine;
calculating a challenge reference score for the second engine based on a comparison of the challenge answer score received from the second engine with the challenge reference score;
publishing the challenge reference score for the second engine for analysis;
entering the user keyword into the second engine;
receiving at least on live result from the second engine based on the user keyword; and
transmitting the live result received from the second engine over the network to the at least one live remote computer system.

20. The method of claim 19, further comprising:
calculating a page relevance score for a page based on a combination of the challenge relevance scores for the first and second engines;
publishing the page reference score; and
combining the live results received from the first and second engines into one live results page that is transmitted to the live remote computer system.

21. The method of claim 20, wherein the page relevance score is calculated based on a vector that includes a position of the challenge results received from the first and second engines.

22. The method of claim 20, wherein in the challenge reference score for the page is calculated by a page relevance score calculation module, further comprising:

training the page relevance score calculation module by:
  entering a plurality of training keywords into the first and second engines;
  receiving a training result page for each training keyword, the training result page being entered into the page relevance score calculation module in association with a respective training keyword; and
  entering a training relevance score for each training results page into the page relevance score, the page relevance score calculation module determining a page-level parameter set based on the training keywords, training results pages and training relevance scores, the page-level parameter set being used to calculate the challenge relevance score.

* * * * *